US009446563B2

(12) United States Patent
Greene et al.

(10) Patent No.: US 9,446,563 B2
(45) Date of Patent: Sep. 20, 2016

(54) LIQUID REPELLING COATING

(71) Applicant: Hi-Tex, Inc., West Bloomfield, MI (US)

(72) Inventors: Richard Wayne Greene, Rock Hill, SC (US); Alfred Hardy Sullivan, Jr., Charlotte, NC (US); Charles C. King, Rutherfordton, NC (US)

(73) Assignee: Hi-Tex, Inc., West Bloomfield, MI (US)

( * ) Notice: Subject to any disclaimer, the term of this patent is extended or adjusted under 35 U.S.C. 154(b) by 0 days.

(21) Appl. No.: 13/711,364

(22) Filed: Dec. 11, 2012

(65) Prior Publication Data
US 2014/0162516 A1 Jun. 12, 2014

(51) Int. Cl.
*B32B 7/00* (2006.01)
*B32B 27/12* (2006.01)
(Continued)

(52) U.S. Cl.
CPC .............. *B32B 5/022* (2013.01); *B32B 3/26* (2013.01); *B32B 5/024* (2013.01); *B32B 5/026* (2013.01);
(Continued)

(58) Field of Classification Search
CPC ............. B32B 2307/72; B32B 2307/722; B32B 2307/726; B32B 2307/7265; B32B 5/00; B32B 5/02; B32B 5/022; B32B 5/14; B32B 5/147; B32B 5/18; B32B 5/20; B32B 5/22; B32B 5/24; B32B 5/245; B32B 5/32; B32B 27/065; B32B 27/12; B32B 27/08; B32B 27/20; B32B 27/302; B32B 27/306; B32B 27/308; B32B 2250/02; B32B 2250/03; B32B 2250/04; B32B 2250/05; B32B 2255/02; B32B 2255/26; B32B 2255/28; B32B 2262/0261; B32B 2262/0269; B32B 2262/0276; B32B 2262/0284; B32B 2262/0292; B32B 2262/04; B32B 2262/062; B32B 2262/065; B32B 2262/067; B32B 2262/08; B32B 2264/102; B32B 2266/00; B32B 2266/02; B32B 2266/0207; B32B 2266/0214; B32B 2266/0221; B32B 2266/0228; B32B 2266/0235; D06N 3/0043; D06N 3/0045; D06N 3/00047; D06N 3/005; D06N 3/0052; D06N 3/0054; D06N 3/0088; D06N 3/045; D06N 3/18; D06N 3/183; D06N 2205/04; D06N 2205/045; D06N 2209/216; D06N 2209/128; D06N 2209/142; D06N 2209/147; D10B 2401/08; D10B 2401/10; Y10T 442/20; Y10T 442/2025; Y10T 442/2041; Y10T 442/2098; Y10T 442/2107; Y10T 442/2123; Y10T 442/2139; Y10T 442/2148; Y10T 442/2164; Y10T 442/2172; Y10T 442/2218; Y10T 442/2189; Y10T 442/2197; Y10T 442/2205; Y10T 442/2213; Y10T 442/2221; Y10T 442/223; Y10T 442/2238; Y10T 442/2246; Y10T 442/2254; Y10T 442/2369; Y10T 442/2484; Y10T 442/2492; Y10T 442/3325; Y10T 442/3341; Y10T 442/469; Y10T 442/647; Y10T 442/649
USPC ........ 442/64–77, 79–90, 221–227, 394, 397, 442/59, 62, 102, 104, 118, 119, 181, 442/221–227, 370; 428/170–171, 218, 428/304.4–319.9
See application file for complete search history.

(56) References Cited

U.S. PATENT DOCUMENTS 3,527,654 A 9/1970 Jones et al.
3,607,341 A 9/1971 Goins et al.
(Continued)

FOREIGN PATENT DOCUMENTS

CN 101990493 A 3/2011
WO 0101827 1/2001

OTHER PUBLICATIONS

Chatterjee, P., Absorbent Technology, Mar. 2002, Elsevier, p. 379-380.*
(Continued)

*Primary Examiner* — Jennifer Chriss
*Assistant Examiner* — Frank Vineis
(74) *Attorney, Agent, or Firm* — Brooks Kushman P.C.

(57) ABSTRACT

A backside coated fabric includes a fabric substrate having a front side (face) and a back side. A water permeable spacer layer is applied to the back side of the fabric substrate. The water permeable spacer layer allows penetration of water into its matrix when hydrostatic water pressure is applied to the face of the fabric substrate. The water permeable spacer layer provides a smooth coating surface onto which subsequent water impermeable barrier layers can be applied creating a physical separating layer between the fabric substrate and the water impermeable barrier layer. A water impermeable barrier layer is disposed over the water permeable spacer layer to provide an impermeable water barrier layer that does not allow penetration of water through the coated fabric when hydrostatic water pressure is applied to the face of the fabric construction.

22 Claims, 8 Drawing Sheets

(51) Int. Cl.

| | | |
|---|---|---|
| *D06M 15/21* | (2006.01) | |
| *D06N 3/00* | (2006.01) | |
| *D06N 3/18* | (2006.01) | |
| *B32B 27/08* | (2006.01) | |
| *D06M 23/04* | (2006.01) | |
| *D06M 23/16* | (2006.01) | |
| *B32B 5/02* | (2006.01) | |
| *B32B 27/20* | (2006.01) | |
| *B32B 27/30* | (2006.01) | |
| *B32B 3/26* | (2006.01) | |
| *D06M 15/233* | (2006.01) | |
| *D06M 15/263* | (2006.01) | |
| *D06N 3/04* | (2006.01) | |

(52) U.S. Cl.
CPC ............... *B32B 27/08* (2013.01); *B32B 27/12* (2013.01); *B32B 27/20* (2013.01); *B32B 27/302* (2013.01); *B32B 27/306* (2013.01); *B32B 27/308* (2013.01); *D06M 15/233* (2013.01); *D06M 15/263* (2013.01); *D06M 23/04* (2013.01); *D06M 23/16* (2013.01); *D06N 3/0043* (2013.01); *D06N 3/0047* (2013.01); *D06N 3/0088* (2013.01); *D06N 3/045* (2013.01); *D06N 3/183* (2013.01); *B32B 2255/02* (2013.01); *B32B 2255/26* (2013.01); *B32B 2262/0261* (2013.01); *B32B 2262/0276* (2013.01); *B32B 2262/04* (2013.01); *B32B 2262/062* (2013.01); *B32B 2262/08* (2013.01); *B32B 2264/102* (2013.01); *B32B 2307/4026* (2013.01); *B32B 2307/726* (2013.01); *B32B 2307/7265* (2013.01); *D06M 2200/12* (2013.01); *D06N 2205/045* (2013.01); *D06N 2209/128* (2013.01); *D06N 2209/142* (2013.01); *D06N 2209/147* (2013.01); *Y10T 442/2098* (2015.04)

(56) References Cited

U.S. PATENT DOCUMENTS

| | | |
|---|---|---|
| 3,804,700 A | 4/1974 | Hoey |
| 3,891,487 A | 6/1975 | Hoey |
| 3,919,451 A | 11/1975 | Levy et al. |
| 3,933,691 A | 1/1976 | Lindemann |
| 4,061,822 A | 12/1977 | Brodnyan et al. |
| 4,242,397 A | 12/1980 | Ferment et al. |
| 4,863,788 A | 9/1989 | Bellairs |
| 4,921,756 A | 5/1990 | Tolbert et al. |
| 4,996,099 A | 2/1991 | Cooke et al. |
| 5,091,243 A | 2/1992 | Tolbert et al. |
| 5,393,600 A * | 2/1995 | Omura ................. D06N 3/0052 427/245 |
| 5,565,265 A | 10/1996 | Rubin et al. |
| 5,736,466 A * | 4/1998 | Wierer et al. .................. 442/67 |
| 5,747,392 A | 5/1998 | Xiao et al. |
| 6,024,823 A | 2/2000 | Rubin et al. |
| 6,046,118 A * | 4/2000 | Jones et al. .................... 442/57 |
| 6,165,920 A | 12/2000 | Rubin et al. |
| 6,207,250 B1 | 3/2001 | Bullock et al. |
| 6,251,210 B1 | 6/2001 | Bullock et al. |
| 6,479,153 B1 * | 11/2002 | Kato ........................ D06N 3/14 427/245 |
| 6,492,001 B1 | 12/2002 | Rubin et al. |
| 6,521,552 B1 | 2/2003 | Honna |
| 6,541,138 B2 | 4/2003 | Bullock et al. |
| 6,884,491 B2 | 4/2005 | Rubin et al. |
| 7,214,288 B2 | 5/2007 | Ying et al. |
| 7,531,219 B2 | 5/2009 | Rubin et al. |
| 2002/0106959 A1 | 8/2002 | Huffines et al. |
| 2004/0018787 A1 | 1/2004 | Bullock et al. |
| 2004/0198121 A1 * | 10/2004 | Huang et al. ................. 442/290 |
| 2007/0254544 A1 | 11/2007 | Rubin et al. |
| 2009/0131858 A1 * | 5/2009 | Fissell .................. B01D 61/145 604/57 |
| 2009/0176056 A1 | 7/2009 | Marin et al. |
| 2010/0287680 A1 | 11/2010 | Johnson et al. |
| 2011/0086208 A1 | 4/2011 | Nemphos, Jr. et al. |
| 2012/0238169 A1 | 9/2012 | Mason et al. |

OTHER PUBLICATIONS

Jena, A., Liquid Extrusion Techniques for Pore Stucture Evaluation of Nonwovens, International Nonwovens Journal, Fall 2003.*
Sen, A., Coated Textiles, CRC Press, 2008, pp. 109 and 127.*
International Search Report dated Mar. 25, 2014 from PCT/US2013/073036 filed Dec. 4, 2013, 3 pgs.
Sen et al. Second Edition Coated Textiles, Principles and Applications Nov. 28, 2007, p. 91-95, "Coating Methods".
Website index of book Coated and Laminated Textiles, May 2002, 5 Pages, Fung et al. http://www.woodheadpublishing,com/en/book.aspx?bookID=504.
European Search Report dated Jun. 29, 2016, EP Appn. No. 13861829.3 filed Jul. 3, 2015, 10 pgs.

* cited by examiner

LIQUID REPELLING COATING

The present invention relates to coated fabrics and in particular to water repelling stain resistant water barrier fabrics.

BACKGROUND OF THE INVENTION

Fabric technologies that produce durable stain resistant textiles with aesthetic qualities that approach untreated fabrics are desired. Stain resistance, water repellency and resistance to microbial growth are important features of such textile materials. Although the prior art methods and coated fabrics work reasonably well, improvements are nonetheless desired.

Accordingly, there is a need for improved coated fabric designs that have improved water barrier properties with a more natural hand.

SUMMARY OF THE INVENTION

The present invention solves one or more problems of the prior art by providing in at least one embodiment, a coated fabric that is water repelling and stain resistant. The coated fabric includes a fabric substrate having a front face and a back side. A water permeable spacer layer is disposed over the back side of the fabric substrate. The water permeable spacer layer allows penetration of water therein when a hydrostatic pressure is applied to the front face of the fabric substrate. A water impermeable barrier layer is disposed over the water permeable spacer layer. The water impermeable barrier layer does not allow penetration of water through the article at the hydrostatic pressure. Moreover, the water permeable spacer layer has a mass density that is less than 80 percent of a mass density of the water impermeable barrier layer. Characteristically, the hydrostatic pressure is greater than 20 millibars. The coated fabric is advantageously water repellant and stain resistant while having a natural "hand" or texture. The coated fabric is also durable, easy to handle and economical to produce.

In another aspect, a coated fabric is provided. The coated fabric includes a fabric substrate having a front face and a back side. A water permeable spacer layer is disposed over the back side of the fabric substrate. The water permeable spacer layer allows penetration of water therethrough at hydrostatic pressures applied to the front face of the fabric substrate greater than or equal to a first hydrostatic pressure when the fabric substrate is only coated with the water permeable spacer layer. A water impermeable barrier layer is disposed over the water permeable spacer layer. The water impermeable barrier layer does not allow penetration of water through the article at hydrostatic pressures applied to the front face of the fabric substrate up to a second hydrostatic pressure. Moreover, the water permeable spacer layer has a mass density that is less than 80 percent of a mass density of the water impermeable barrier layer. Characteristically, the second hydrostatic pressure is greater than the first hydrostatic pressure. The coated fabric is advantageously water repellant and stain resistant while having a natural "hand" or texture. The coated fabric is also durable, easy to handle and economical to produce.

In another aspect, a coated fabric is provided. The coated fabric includes a fabric substrate having a front face and a back side. A water permeable spacer layer is disposed over the back side of the fabric. The water permeable spacer layer allows penetration of water therethrough at hydrostatic pressures applied to the front face of the fabric substrate that are greater than or equal to a first hydrostatic pressure. The first hydrostatic pressure is from 0 to 20 millibar as determined by AATCC Test Method 127-2008. The coated fabric also includes a water impermeable barrier layer disposed over the water permeable spacer layer. The water impermeable barrier layer does not allow penetration of water through the article at hydrostatic pressures applied to the front face of the fabric substrate up to a second hydrostatic pressure. The second hydrostatic pressure is from 20 to 110 millibar as determined by AATCC Test Method 127-2008. Moreover, the water permeable spacer layer has a mass density that is less than 80 percent of a mass density of the water impermeable barrier layer. The coated fabric is advantageously water repellant and stain resistant while having a natural "hand" or texture. The coated fabric is also durable, easy to handle and economical to produce.

In yet another aspect, a coated fabric is provided. The coated fabric includes a fabric substrate having a front face and a back side. A first layer contacts the back side of the fabric and includes a plurality of collapsed pores. A second layer disposed over the first layer and is substantially free of pores.

BRIEF DESCRIPTION OF THE DRAWINGS

Exemplary embodiments of the present invention will become more fully understood from the detailed description and the accompanying drawings, wherein.

DESCRIPTION OF THE INVENTION

Figure 1:
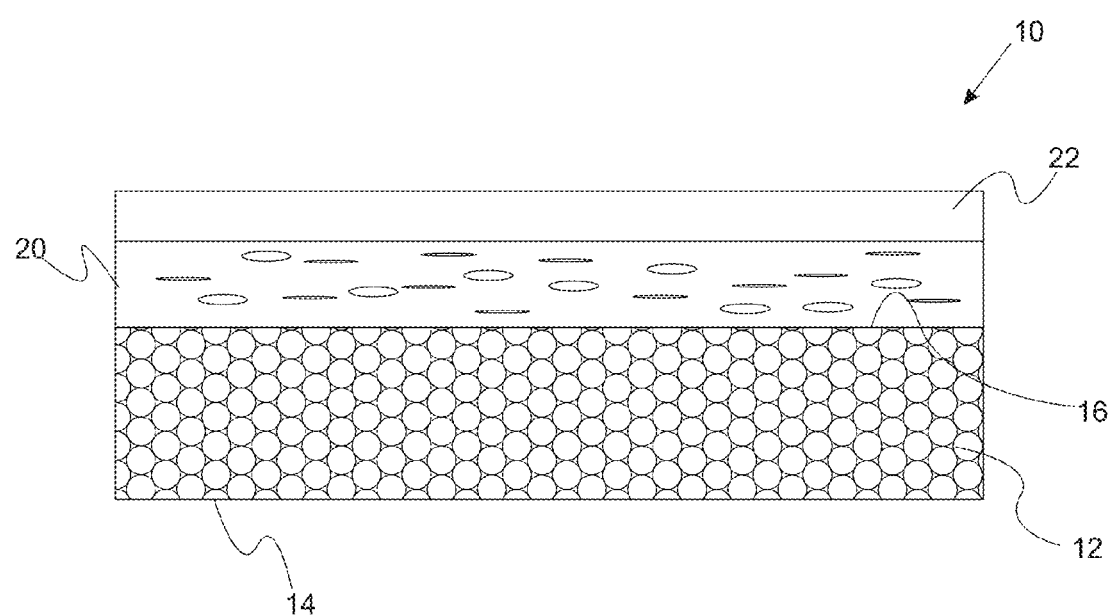
FIG. 1 provides a schematic cross section of a coated textile.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The term "hand" as used in at least one embodiment refers to the way a fabric feels when touched. The "hand" of a fabric is often described by adjectives such as softness, crispness, dryness, and silkiness. Good hand refers to fabrics that exhibit shape retention without stiffness.

The term "hydrostatic pressure" as used in at least one embodiment refers to the force distributed over an area exerted by water.

The term "latex" as used in at least one embodiment refers to a stable dispersion and/or emulsion of a polymer in water.

The term "aspect ratio" as used in at least one embodiment refers to the ratio as the ratio of the minimum and maximum Feret diameters of a pore or particle. For example, the aspect ratio of a circular pore is 1. The aspect ratio for a completely compressed pore is nearly zero in the idealized case.

The term "Feret diameters" as used in at least one embodiment refers to the distance between two tangents parallel to the opposite sides of the particle.

The term "water barrier" as used in at least one embodiment means essentially impermeable to water. In particular, "water barrier" means that a textile or coated textile or layer can support a considerable column of water without water penetration through the coated fabric construction.

The term "water resistant" as used in at least one embodiment means the characteristic of a fabric to resist wetting and penetration with water by the force of gravity. It is noted that this is different from other usage of this term referring to coatings that are chemically stable to water or which will not be washed off by water (wash/leach durable) though the coated fabrics set forth below also have this property.

The term "synthetic fabric" as used in at least one embodiment means a fabric containing at least 40 weight percent of synthetic polymer fibers, e.g. nylon fibers, polyester fibers, and the like. The fibers useful in one or more embodiments are typically those which can be transfer-printed.

The term "drape" as used in at least one embodiment refers to the manner in which a cloth falls or hangs.

The term "pore volume" as used in at least one embodiment refers to the volume of void or empty space contained within pores.

The term "residue" as used in at least one embodiment refers to that portion of a chemical compound that remains in the dry water permeable spacer layer or the dry water impermeable barrier layer after drying and/or curing takes place to form these dried layers. Therefore, in one sense, it is the drying and/or curing of the product that forms these layers.

The term "pore number density" as used in at least one embodiment refers to the number of pores per volume, or in the case of cross sections, the number of pores per area.

With reference to FIG. 1, back side coated fabric 10 includes fabric substrate 12 having front side surface 14 (i.e., a front face) and back side surface 16. Typically, coated fabric 10 is in the form of a sheet. Front side surface 14 is viewable in applications (e.g., upholstery) utilizing the coated fabric 10 while back side surface 16 is generally not exposed or viewable in such applications. It should also be appreciated that fabric substrate 12 can have virtually any thickness. However, fabric thicknesses of 0.5 to 2.0 mm are typical. Water permeable spacer layer 20 is disposed over and contacts back side surface 16 while water impermeable barrier layer 22 is disposed over and typically contacts water permeable spacer layer 20. It should be appreciated that water permeable spacer layer 20 and water impermeable barrier layer 22 can each independently be built up from several sub-layers to obtain the requisite hydrostatic properties. Advantageously, water permeable spacer layer 20 provides a physical separation between fabric substrate 12 and water impermeable barrier layer 22. In this regard, water permeable spacer layer 20 has a dry thickness in increasing order of preference greater than or equal to about 0.5 mils, 1.0 mil, and 2.0 mils. In a refinement, water permeable spacer layer 20 has a dry thickness in increasing order of preference less than or equal to about 10 mils, 9 mils, 2 mils, and 5 mils, and 2.0 mils. Alternatively, the amount of water permeable spacer layer 20 is expressed in terms of the ounces per square yard (osy) of fabric substrate 12. Typically, water permeable spacer layer 20 is present in an amount of 0.3 to 15 ounces per square yard of fabric. In a refinement, water permeable spacer layer 20 is present in an amount of 0.5 to 10 ounces per square yard of fabric. In another refinement, water permeable spacer layer 20 is present in an amount of 0.5 to 15 ounces per square yard of fabric. In still another refinement, water permeable spacer layer 20 is present in an amount of 0.5 to 2 ounces per square yard of fabric.

The physical separation between fabric substrate 12 and water impermeable barrier layer 22 provided by water permeable spacer layer 20 provides for a smoothing effect when fabric substrate 12 has an irregular texture along back side surface 16. For example, the fabrics within fabric substrate 12 may protrude from back side surface 16 thereby rendering it difficult to completely cover back side surface 16 without protrusions extending completely through a thin water impermeable barrier layer thereby leading to failure. Such protrusions provide an undesirable path for liquid to move through any such water impermeable barrier layer. Water impermeable barrier layer 22 has a sufficient dry thickness in order to support a column of water of at least 20 cm in height. Water impermeable barrier layer 22 has a dry thickness in increasing order of preference greater than or equal to about 0.5 mils, 1.0 mil, and 2.0 mils. In a refinement, water impermeable barrier layer 22 has a dry thickness in increasing order of preference less than or equal to about 13 mils, 10 mils, 9 mils, 2 mils, and 5 mils, and 2.0 mils. In a variation, the combined dry thickness of water permeable spacer layer 20 and water impermeable barrier layer 22 is less than or equal in increasing order of preference 10, 15, and 23 mils. Alternatively, the extent of water impermeable barrier layer 22 is expressed in terms of the ounces per square yard (osy). Typically, water impermeable barrier layer 22 is present in an amount of 0.5 to 20 ounces per square yard of textile. In a refinement, water impermeable barrier layer 22 is present in an amount of 1 to 15 ounces per square yard of textile. In another refinement, water impermeable barrier layer 22 is present in an amount of 1 to 15 ounces per square yard of textile. In yet another refinement, water impermeable barrier layer 22 is present in an amount of 1 to 3 ounces per square yard of textile. Water permeable spacer layer 20 and water impermeable barrier layer 22 are advantageously formed from aqueous dispersions as set forth below in more detail.

Coated fabric 10 is also characterized by a number of rigidity and compression parameters that relate to the hand. For example, coated fabric 10 typically has a bending rigidity from 0.35 to 0.7 gf·cm²/cm. In a refinement, coated fabric 10 has a bending rigidity from 0.35 to 0.5 gf·cm²/cm. In another refinement, coated fabric 10 has a compressional resilience (L+C, see below) from 25 to 30 percent.

The fabric substrate 12 includes textiles such as woven, non-woven and knitted fabrics, and component made from yarn or piece dyed upholstery woven fabrics of natural fibers, synthetic fibers and mixtures of natural and synthetic fibers. Suitable natural fibers include, but are not limited to, fibers of cotton, linen, ramie, silk, wool and the like. Suitable synthetic fibers include, but are not limited to, fibers of polyamides (nylon), polyester, polyacrylic, rayon, acetate and the like. Suitable fabrics also include, but are not limited to, jacquards (i.e., fabrics manufactured from a jacquard loom), brocades, dobbys (i.e., fabrics manufactured from a dobby loom), base fabrics comprising corespun yarn containing fiberglass overwrapped with a synthetic polymeric fiber, and canvases. When the base fabric comprises a corespun yarn containing fiberglass overwrapped with a synthetic polymeric fiber, the treated fabric is suitable for replacing the flame barrier and printed fabric in upholstery and other applications, and is further suitable for highly flame retardant commercial and industrial uses, for example, as drapery material. Examples of such corespun yarns may be found in U.S. Pat. Nos. 4,921,756; 4,996,099 and 5,091,243, herein incorporated by reference. Synthetic textile fabrics are polyester fabrics and nylon fabrics.

The water permeability of water permeable spacer layer 20 and water impermeable barrier layer 22 may be determined by any number of test methods known to those skilled in the art. A particularly convenient test for water penetration is AATCC Test Method 127-2008 available from the AATCC Technical Manual, 2012 Edition, pp. 207-208; the entire disclosure of which is hereby incorporated by reference. In general, water permeable spacer layer 20 allows penetration of water therethrough. However, water permeable spacer layer 20 may not allow water penetration up to a maximum hydrostatic pressure. In a refinement, water permeable spacer layer does not allow penetration of water therethrough at hydrostatic pressures applied to the front face of the fabric substrate greater than or equal to a first hydrostatic pressure. Water impermeable barrier layer 22 does not allow penetration of water through the article at hydrostatic pressures applied to the front face of the fabric substrate up to a second hydrostatic pressure. Characteristically, the second hydrostatic pressure is greater than the first hydrostatic pressure. It should be appreciated that water impermeable barrier layer 22 may also prevent water penetration at pressures higher than the second hydrostatic pressure. The water penetration properties of water permeable spacer layer 20 are optionally determined when the fabric substrate is only coated with water permeable spacer layer 20. In some variations, the ratio of the second hydrostatic pressure to the first hydrostatic pressure is greater than or equal to, in increasing order of preference 1, 2, 3 5, and 10. In some refinement, the first hydrostatic pressure is less than or equal to in increasing order of preference, 30 millibars, 20 millibars, 10 millibars, 5 millibars, and 2 millibars. In other refinements, the second hydrostatic pressure is greater than or equal to in increasing order of preference, 20 millibars, 30 millibars, 40 millibars, 50 millibars, and 60 millibars. In another refinement, the first hydrostatic pressure is from 0 to 20 millibars and the second hydrostatic pressure is from 20 millibars to 110 millibars or greater. In another refinement, the first hydrostatic pressure is from 0 to 20 millibars and the second hydrostatic pressure is from 30 millibars to 110 millibars or greater. In still another refinement, the first hydrostatic pressure is from 0 to 10 millibar and the second hydrostatic pressure is from 50 millibar to 100 millibars. In yet another variation, the second hydrostatic pressure is about 100 millibar. For example, water permeable spacer layer 20 is unable to support a water column (at 21° C.) greater than 20 cm in height without penetration while water impermeable barrier layer 22 is able to support a water column (at 21° C.) greater than 30 cm in height without substantial penetration. In another example, water permeable spacer layer 20 is unable to support a water column (at 21° C.) greater than 10 cm in height without penetration while water impermeable barrier layer 22 is able to support a water column (at 21° C.) greater than 30 cm in height without substantial penetration. It should be appreciated that water resistance is defined with respect to the specific test used. Therefore, all the measurements used herein are determined by AATCC Test Method 127-2008. It should, however, be appreciated that relative water resistance can be discussed independent of the test used.

Figure 2A:
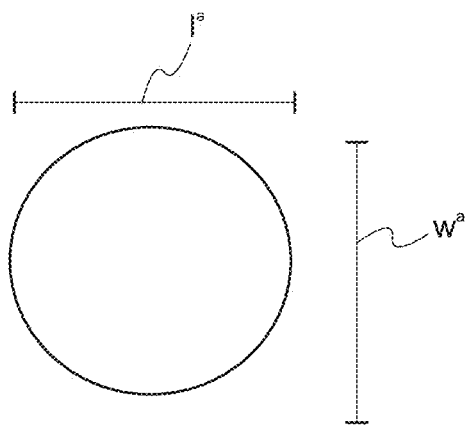
FIG. 2A provides a schematic cross section of a spherical pore.
Figure 2B:
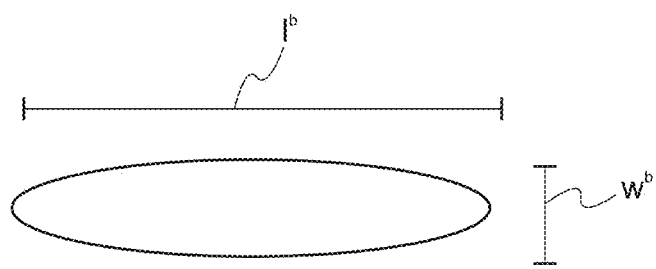
FIG. 2B provides a schematic cross section of an ellipsoidal pore.
Figure 2C:
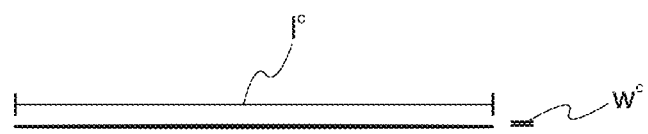
FIG. 2C provides a schematic cross section of a collapsed or crushed pore.

With reference to FIG. 2, schematic cross sections of various pores that are present in water permeable spacer layer 20 set forth above are provided. FIG. 2A provides a cross section of spherical pores. FIG. 2B provides a cross section of ellipsoidal pores. FIG. 2C provides a cross section of nearly completely compressed pores. Sometimes, pores are referred to as cells, especially when water permeable spacer layer 20 is a non-crushed foam or crushed foam layer.

Variations herein include both open and/or closed cells. The spherical pores of FIG. 2A possess an aspect ratio of about 1 which is the ratio of the spatial dimensions $w^a$ and $l^a$. The ellipsoidal pores of FIG. 2B have an aspect ratio significantly less than 1 which is the ratio of the spatial dimensions $w^b$ and $l^b$. The completely crushed pores of FIG. 2C have very low aspect ratios approaching 0 which is the ratio of the spatial dimensions $w^c$ and $l^c$. In a refinement, the majority of the pores have a maximum Feret diameter less than, in increasing order of preference, 300 microns, 200 microns, and 100 microns and a maximum Feret diameter greater than, in increasing order of preference, 1 micron, 5 microns and 10 microns. In another refinement, the pores have an average maximum Feret diameter less than, in increasing order of preference, 300 microns, 200 microns, and 100 microns and an average maximum Feret diameter greater than, in increasing order of preference, 1 micron, 5 microns and 10 microns. Layers having completely collapsed pores can appear as non-porous on SEM cross sections. In a refinement, water permeable spacer layer 20 is such that the majority of pores have an aspect ratio less than 0.5. In another refinement, water permeable spacer layer 20 is such that the majority of pores have an aspect ratio less than 0.1. However, it should be appreciated that the boundaries between the pore surface are typically still present thereby layer mechanically different than a non-porous homogeneous film. In particular, such films are not water resistant being unable to support a column of water to a height of 20 cm. In a refinement, the pore volume is less than, in increasing order of preference, 50%, 40%, 30%, 20% and 5%. The lower pore volumes are typically obtained by crushing water permeable spacer layer 20. In another refinement, the pore volumes are greater than or equal to in increasing order of preference 5%, 3%, 1%, and 0%. The pore number density in water permeable spacer layer 20 is such that a cross section (e.g., an SEM cross section) of the spacer layer reveals greater than, in order of increasing preference, 500 pores per square centimeter, 1,000 pores per square centimeter, 2,000 pores per square centimeter, 3,000 pores per square centimeter, and 5000 pores per square centimeter. Similarly, the pore number density in water permeable spacer layer 20 is such that a cross section of the spacer layer reveals less than, in order of increasing preference, 40,000 pores per square centimeter, 30,000 pores per square centimeter, 25,000 pores per square centimeter, 15,000 pores per square centimeter, and 20,000 pores per square centimeter. In a refinement, a cross section of the spacer layer reveals 1,000 to 20,000 pores per square centimeter. In another refinement, the pore number density is from about 100,000 to about 2,000,000 pores per centimeter cubed. In another refinement, the pore number density is from about 100,000 to about 1,000,000 pores per centimeter cubed. It should be appreciated that pore number density is estimated by scanning electron micrographs (SEM) of cross sections of water permeable spacer layer 20. For non-crushed foam layer this analysis is straightforward. For crushed foam layers, the pore densities are estimated from representative non-crushed samples. Water impermeable barrier layer 22 is substantially free of pores in order to minimize water penetration. Therefore, water impermeable barrier layer 22 has a pore number density such that a SEM cross section of the water impermeable barrier layer reveals less than 1,000 per square centimeter. In this regard water impermeable barrier layer 22 has a pore volume less than, in increasing order of preference, 5%, 3%, 1%, 0.5% and 0.2%.

Although not limited to any particular theory of operation, the minimal penetration of water permeable spacer layer 20 into fabric substrate 12 while still maintaining appreciable adhesion thereto is believe to be one mechanism that improves the hand. In a refinement, water permeable spacer layer 20 penetrates into fabric substrate 12 by a distance that is at most, in increasing order of preference, 50% 30%, 20%, 10%, and 5% of the thickness of fabric substrate 12 and at least, in order of increasing preference, 5%, 2%, 1%, and 0% of the thickness of fabric substrate 12.

In a variation, water permeable spacer layer 20 and water impermeable barrier layer 22 each independently include polymers which may be homo-polymers or copolymers. Examples of useful polymers include, but are not limited to, polyvinyl acetate, vinyl acetate-ethylene, acrylic homo-polymers, acrylic copolymers, acrylate-acrylonitrile copolymers, ter-polymers of vinyl acetate-vinyl chloride-ethylene, ethylene-vinyl chloride copolymers, vinyl acrylic polymers, styrene acrylic polymers, styrene butadiene rubbers, chloroprene polymers, poly-vinylidene chloride polymers, polymers based on itaconic and acrylic acid, silicone resins, and combinations and derivatives thereof. In a refinement, the polymers have a glass transition temperature (Tg) in the range of −45° C. to 100° C. Typically, water permeable spacer layer 20 and water impermeable barrier layer 22 each independently include polymers in an amount from about 80 to 100 weight percent of the total weight of the respective layer. In a refinement, water permeable spacer layer 20 and water impermeable barrier layer 22 each independently include polymers in an amount from about 80 to 99 weight percent of the total weight of the respective layer. In another refinement, water permeable spacer layer 20 and water impermeable barrier layer 22 each independently include polymers in an amount from about 85 to 95 weight percent of the total weight of the respective layer. In still another refinement, water permeable spacer layer 20 and water impermeable barrier layer 22 each independently include polymers in an amount from about 85 to 90 weight percent of the total weight of the respective layer. In another variation, water permeable spacer layer 20 and water impermeable barrier layer 22 each independently include residues of various formulation additives that are used to produce each layer. Examples of such formulations include, but are not limited to, glycols, glycol esters, surfactants and foaming agents, wax dispersions, fluorocarbons, dispersants, wetting agents, leveling agents, defoamers, hydroxyl-ethyl cellulose thickeners, carboxy-methyl cellulose thickeners, polyurethane thickeners, rheology modifiers, alkali swellable thickeners, mildew/mold inhibitors, fungicides, phosphorous and melamine based flame retardant salts/solutions, mica, talc, calcium carbonate, zinc oxide, titanium dioxide, pigments, and combinations thereof. Collectively, residues of such additives are present in an amount of about 0 to 20 weight percent of the total weight of the respective layer. In a refinement, residues of such additive are present in an amount of about 1 to 20 weight percent of the total weight of the respective layer. In a refinement, residues of such additives are present in an amount of about 5 to 15 weight percent of the total weight of the respective layer. In a refinement, residues of such additives are present in an amount of about 10 to 15 weight percent of the total weight of the respective layer. In a variation, water permeable spacer layer 20 and water impermeable barrier layer 22 each independently include a fluorochemical. In a refinement, the fluorochemical is an amount from about 0.2 weight percent to about 3.0 weight percent. In a refinement, the fluorochemical includes unbranded generic fluoropolymers. Other examples of fluorochemicals include, but are not limited to, partially fluorinated urethanes, fluorinated copolymers, fluorinated acrylic copolymers, partially fluorinated condensation polymers, perfluoroalkyl acrylic copolymers, perfluoroalkylethyl methacrylate copolymers, perfluoroalkyl methacrylic copolymers, perfluoroalkylethyl methacrylate copolymers, and combinations thereof. Suitable fluorochemical treating agents include, but are not limited to, the commercially available fluorochemical compositions SCOTCHGUARD™ FC 255, SCOTCHGUARD™ FC 214-230, available from 3M, and ZONYL™ RN, ZONYL™ 8070, and ZONYL™ 8787, available from E.I. Dupont de Nemours, and mixtures thereof. It should also be pointed out that water permeable spacer layer 20 and water impermeable barrier layer 22 typically have different chemical compositions since each layer typically includes the residues of different polymers and additives. For example, impermeable layer 22 typically has a greater amount of thickener residues since this layer is formed from a more viscous composition as set forth below.

In another variation, the dry mass density of water permeable spacer layer 20 is less than the mass density of water impermeable barrier layer 22. For example, the mass density of water permeable spacer layer 20 is less than or equal to, in order of increasing preference, 80%, 70%, 60%, 50% of the mass density of water impermeable layer 22. The mass density of water impermeable barrier layer 22 is typically about 0.18 g/ml for an non-crushed foam and 0.35 g/ml for a crushed foam. In a refinement, the mass density of water permeable spacer layer 20 is from 0.1 g/ml to 0.7 g/ml. In another variation, the mass density of water permeable spacer layer 20 is from 0.15 g/ml to 5.0 g/ml. In another variation, the mass density of water permeable spacer layer 20 is from 0.2 g/ml to 0.4 g/ml. The mass density of water impermeable barrier layer 22 is typically about 1 g/ml. In a refinement, the mass density of water impermeable barrier layer 22 is from 0.75 g/ml to about 1.3 g/ml. In another refinement, the mass density of water impermeable barrier layer 22 is from 0.8 g/ml to about 1.2 g/ml. In another refinement, the mass density of water impermeable barrier layer 22 is from 0.9 g/ml to about 1.2 g/ml.

In a variation, fabric substrate 12 is independently pre-treated with a fluorochemical textile treatment composition in order to provide additional liquid and or stain repellency to the coated textile. Examples of such treatment are provided in U.S. Pat. Nos. 6,207,250; 5,565,265 and 6,024,823; the entire disclosures of which are hereby incorporated by reference. Specifically, the fabric is contacted with a penetrating topical fluorochemical composition prior to application of water permeable spacer layer 20 and water impermeable barrier layer 22. The topical fluorochemical composition includes a fluorochemical treating agent, one or more antimicrobial agents (microbicides and/or mildewcides), and water. The nature of the fluorochemical treatment composition is such that the fabric is thoroughly treated by topically treating the fabric, the fluorochemical treatment composition covering equally well both sides (i.e., surfaces) of the fabric as well as penetrating the surfaces of the fabric to cover the interstitial spaces within the fabric. The fabric is then oven dried at elevated temperatures, for example, from 250° F. to 350° F. (121° C. to 177° C.), resulting in a primarily treated fabric. The primarily treated fabric is mildew resistant, stain resistant and water repellant. Examples of useful fluorochemicals are fluoropolymers set forth above. The fluorochemical treating agent typically comprises from about 5 to about 25 weight percent solids, based on the weight of the fluorochemical treating agent, and preferably comprises from about 8 to about 20 weight percent solids, and most preferably comprises about 18.5 weight percent solids. In a refinement, the fluorochemical is present on the treated fabric in an amount from about 1.2 weight percent to about 8 weight percent of the weight of the fabric prior to treatment. In another refinement, the fluorochemical is present on the treated fabric in an amount from about 1.5 weight percent to about 6 weight percent of the weight of the fabric prior to treatment. In still another refinement, the fluorochemical is present on the treated fabric in an amount from about 1.8 weight percent to about 3.6 weight percent of the weight of the fabric prior to treatment.

Figure 3:
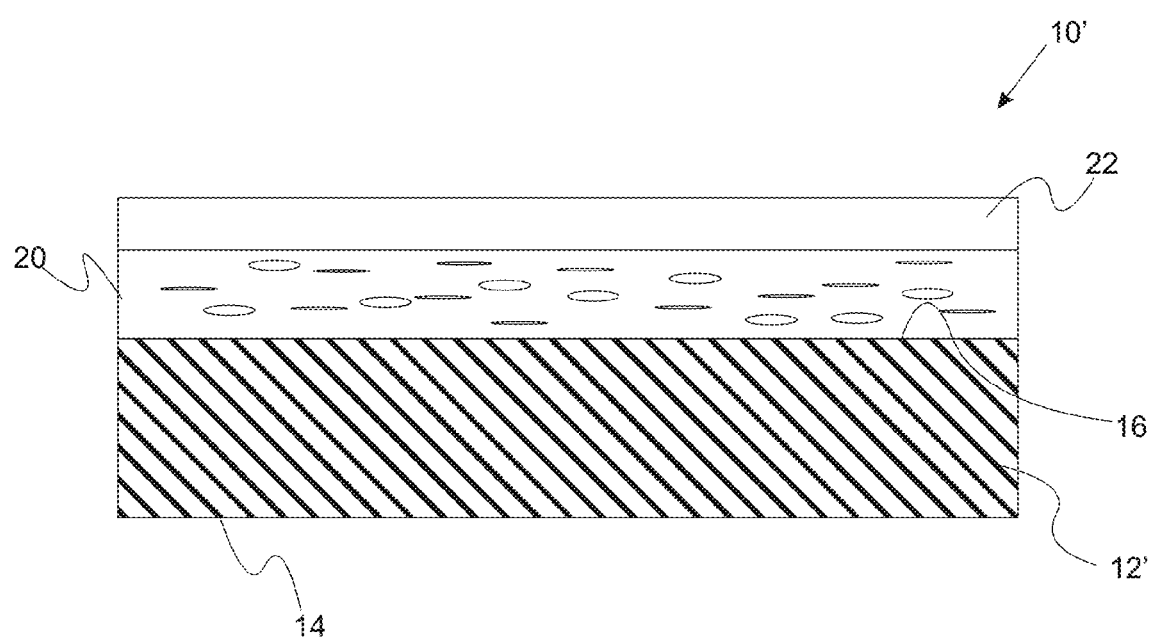
FIG. 3 provides a schematic cross section of a non-fabric substrate.

With reference to FIG. 3, a coated non-fabric substrate is provided. Non-fabric substrate 12' includes a front side surface 14 and back side surface 16. Front side surface 14 is viewable in applications utilizing the coated fabric 10 while back side surface 16 is generally not exposed or viewable in such applications. Water permeable spacer layer 20 contacts back side surface 16 while water impermeable barrier layer 22 is disposed over and typically contacts water permeable spacer layer 20. As set forth above, water permeable spacer layer 20 provides a physical separation between fabric substrate 12 and water impermeable barrier layer 22. Such physical separation provides for a smoothing effect when fabric substrate 12 has an irregular texture along back side surface 16. Examples of suitable non-fabric substrates include, but are not limited to, wood, wood composites, cellulosic based composites, carpeting, paper and paper board materials, synthetic foams, thermoplastic fiber, cellulosic fiber, and glass fiber based wovens and nonwovens, masonry materials, cement-containing materials, concrete-containing materials, ceiling tiles made of pulp, glass, and/or recycled materials, and rubber materials.

Figure 4:
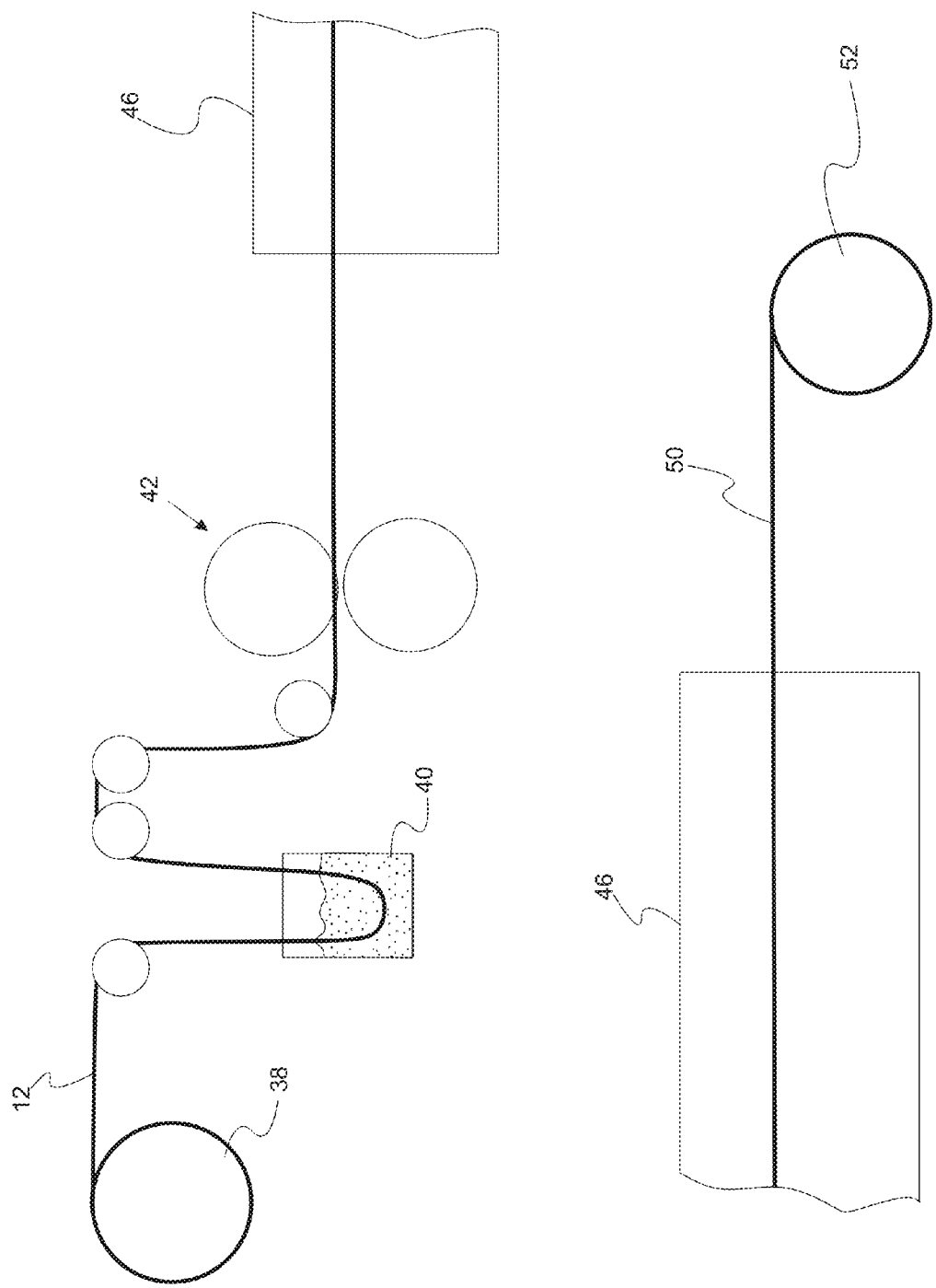
FIG. 4 provides a schematic of a system for treating a fabric substrate with a fluorochemical composition.

In another aspect, a method of forming the water repellent coated fabric set forth above is provided. The method includes an optional pre-treatment step in which fabric substrate 12 is contacted with a penetrating topical fluorochemical composition as set forth in U.S. Pat. No. 7,531,219, the entire disclosure of which is hereby incorporated by reference. The topical fluorochemical composition includes a fluorochemical treating agent, one or more antimicrobial agents (microbicides and/or mildewcides), and water. The nature of the fluorochemical treatment composition is such that fabric substrate 12 is thoroughly treated by topically treating fabric substrate. In a variation as depicted in FIG. 4, the fluorochemical composition equally covers both sides (i.e., surfaces 14 and 16) of fabric substrate 12 as well as penetrating the surfaces of the fabric to cover the interstitial spaces within the fabric. In one refinement, fabric substrate 12 is fed from feed roll 38 and drawn through bath 40 of the treatment composition by any convenient method. In another variation, the topical fluorochemical composition is sprayed or kiss-rolled onto fabric substrate 12. Fabric substrate 12 is optionally scoured to remove textile yarn finishes, soaps, etc., prior to being drawn through bath 40 of the topical fluorochemical composition, as the primary treatment composition should uniformly coat both surfaces of the fabric as well as its interior. After being drawn through a bath 40, fabric substrate 12 is typically passed through nips or nip rollers 42 to facilitate thorough penetration of the fluorochemical composition and/or to adjust the amount of the topical fluorochemical composition relative to the fabric (i.e. wet pickup). In a refinement, the wet pickup is from about 30 to 200 weight percent wet pickup relative to the weight of the untreated fabric substrate. In another refinement, the wet pickup is from about 60 to 150 weight percent wet pickup relative to the weight of the untreated fabric substrate. In still another refinement, the wet pickup is from about 80 to 120 weight percent wet pickup relative to the weight of the untreated fabric substrate. Fabric substrate 12 is then dried in oven 46 at elevated temperatures, for example, from 250° F. to 350° F. (121° C. to 177° C.), resulting in a treated fabric substrate 50 which is received onto pickup roll 52.

The fluorochemical composition typically includes the fluorochemical in an amount from about 5 to about 20 weight percent, more preferably from about 6 to about 12 weight percent, and most preferably about 10 weight percent. The fluorochemicals provide water repellency, water resistance and stain resistance and may comprise unbranded generic fluoropolymers. In a refinement, the fluorochemicals include a component selected from the group consisting of partially fluorinated urethane, fluorinated copolymer, fluorinated acrylic copolymer, partially fluorinated condensation polymer, perfluoroalkyl acrylic copolymer, perfluoroalkylethyl methacrylate copolymer, perfluoroalkyl methacrylic copolymer, perfluoroalkylethyl methacrylate copolymer, and combinations thereof. Suitable fluorochemical treating agents include, but are not limited to, the commercially available fluorochemical compositions SCOTCHGUARD™ FC 255, SCOTCHGUARD™ FC 214-230, available from 3M, and ZONYL™ RN, ZONYL™ 8070, and ZONYL™ 8787, available from E.I. Dupont de Nemours, and mixtures thereof. The fluorochemical treating agent typically comprises from about 5 to about 25 weight percent solids, based on the weight of the fluorochemical treating agent, and preferably comprises from about 8 to about 20 weight percent solids, and most preferably comprises about 18.5 weight percent solids. The amount of fluorochemical treating agent used in the treatment composition of the present invention is considerably higher than that traditionally used for treating upholstery fabric to render it stain resistant.

Figure 5:
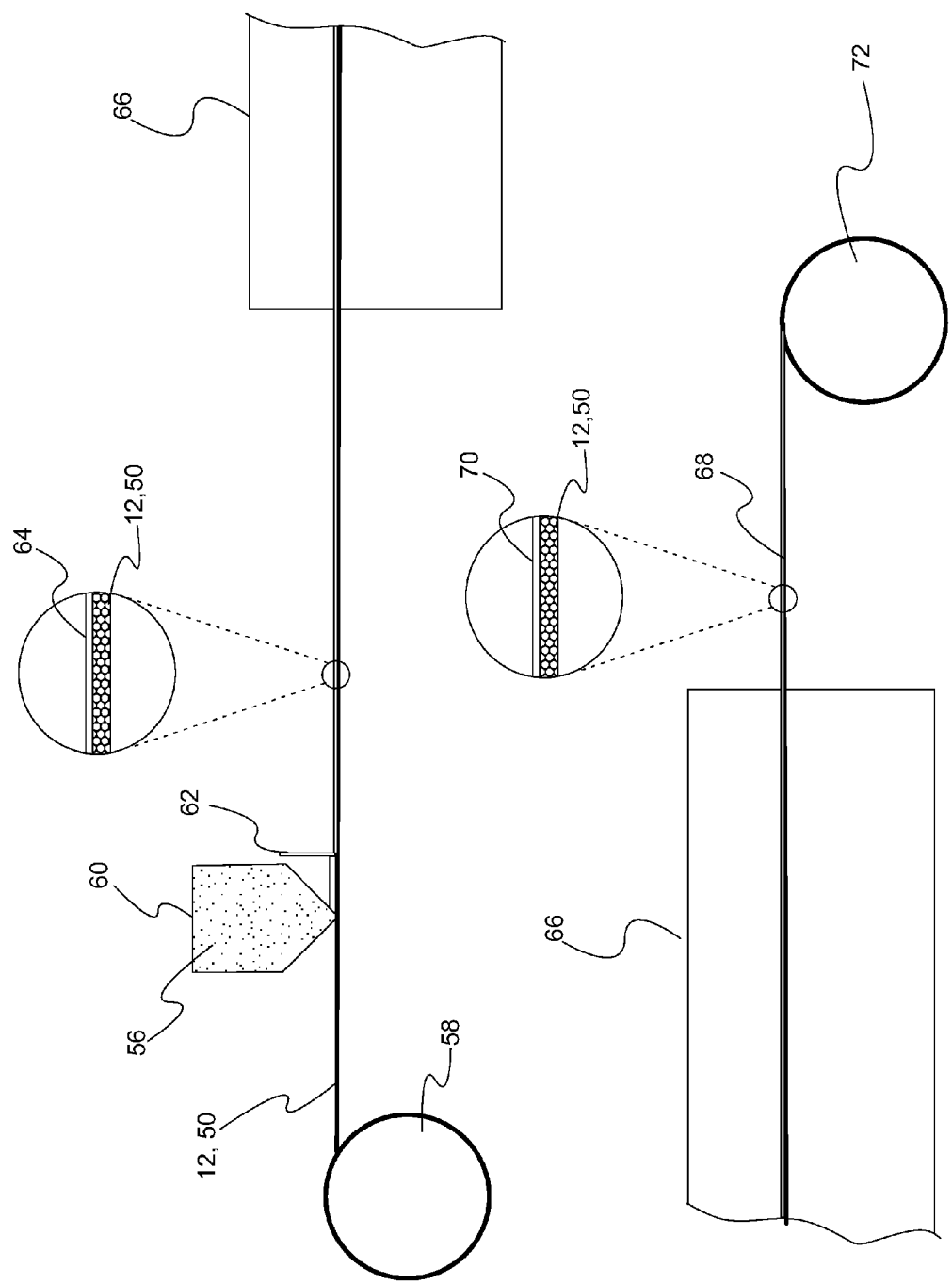
FIG. 5 provides a schematic of a system for applying a water permeable spacer layer to a fabric substrate.

With reference to FIG. 5, fabric substrate 12 or treated fabric substrate 50 is then coated with a first coating composition 56 in order to form water permeable spacer layer 20 onto back side surface 16. Fabric substrate 12 or treated fabric substrate 50 is drawn from roll 58 through applicator 60. Applicator 60 is used to apply first coating composition 56 while spreader 62 (e.g., knife edge) is used to set the thickness of the first coating composition thereby resulting in a first uncured layer 64 disposed on fabric substrate 12 or treated fabric substrate 50. It should also be appreciated that any number of application techniques (e.g., spraying, rolling, etc.) known to those skilled in the art of textile coating may be used to apply first coating composition 56. Typically, first coating composition 56 is a relatively low viscosity coating composition having a viscosity from about 4,000 to 12,000 cps (Brookfield viscometer RVT spindle #3 at 20 rpm at 20° C.). In a refinement, first coating composition 56 has a viscosity from about 6,000 to 9,000 cps (Brookfield viscometer RVT spindle #3 at 20 rpm at 20° C.). Water permeability is created by any of several methods. In one refinement, mechanically introduced into first coating composition 56 forming a foam, prior to application to the back side of the fabric construction. Such a foam can be formed by mechanically introducing air into first coating composition 56. Alternatively, a blowing agent can be included in first coating composition 56. The fabric substrate is then cured at exit web temperatures of 225° F. to 350° F. by passage through oven 66 to form a cured coated substrate 68 with at least a partially cured water permeable spacer layer 70 disposed thereon. In this context, drying means removal of solvent, which is typically water. Cured coated substrate 68 is then collected onto pickup roll 72.

Figure 6:
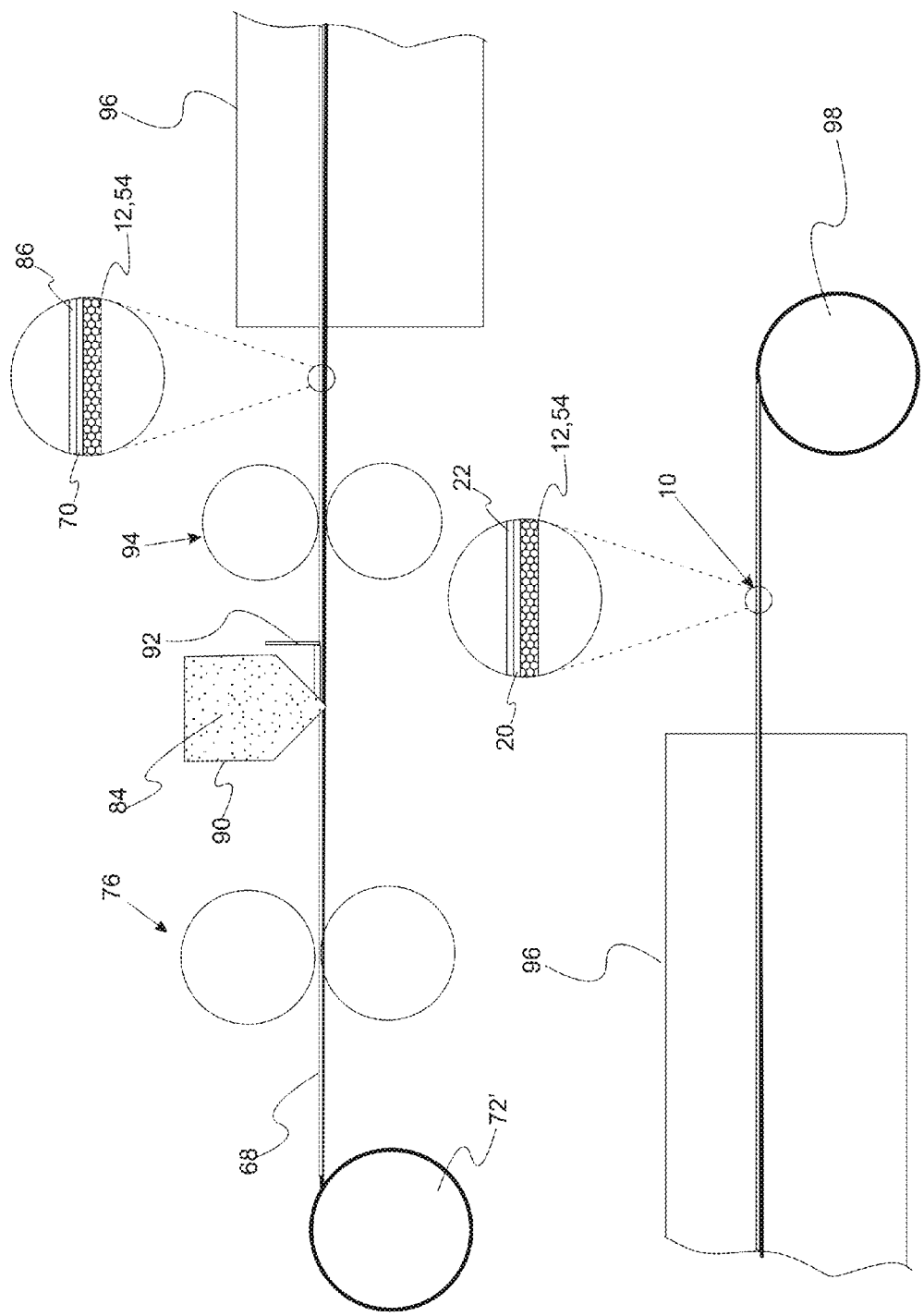
FIG. 6 provides a schematic of a system for applying a water impermeable barrier layer to a coated fabric substrate.

With reference to FIG. 6, cured coated substrate 68 is then coated with water impermeable barrier layer 22 as follows. In a refinement, cured coated substrate 68 is drawn from roll 72' and then compressed (e.g., crushed) by passing through nip rollers 76. In a refinement, cured coated substrate 68 is crushed at a pressure of 2.0 to 5.5 bar (30 to 80 psi). Compression of cured coated substrate 68 typically reduces the thickness of the water permeable spacer layer 70. For example, the thickness of the water permeable spacer layer is reduced by at least 25 percent by such compression. The percent thickness reduction is calculated at the initial thickness minus the compressed thickness divided by the initial thickness times 100 percent. In other refinements, the thickness of the water permeable spacer layer is reduced by 25 percent to 75 percent by such compression. In still other refinements, the thickness of the water permeable spacer layer is reduced by 25 percent to 50 percent by such compression. It should also be appreciated that water impermeable barrier layer 22 may also be applied without such pre-application compression. A second coating composition 84 is applied to over the water permeable spacer layer to form an uncured second layer 86. Second coating composition 84 is applied via applicator 90 and spreader 92 (e.g., a knife edge, Meyer rod, etc.) which sets the thickness of uncured second layer 86. Typically, second coating composition 84 is a paste-like viscous latex composition as set forth below in more detail. The fabric substrate is then optionally passed through nip rollers 94. The coated fabric substrate is then cured (i.e., dried) by passing through oven 96 at exit web temperatures of 225° F. to 350° F. Cured coated fabric 10 is then collected onto pickup roll 98.

In one variation, first coating composition 56 and second coating composition 84 are each independently a latex composition. It should also be appreciated that first coating composition 56 and second coating composition 84 may also include or utilize other solvents or combinations of solvents. In other variations, first coating composition 56 and second coating composition 84 each independently include a minimal amount of solvent (e.g., less than 10 weight percent) such as is the case for thermosetting compositions. However, water based compositions are particularly desirable due to the reduced safety and environmental concerns of aqueous systems. Therefore, first coating composition 56 and second coating composition 84 each independently include water in an amount from about 5 to 30 weight percent of the respective composition. In a refinement, first coating composition 56 includes a polymer dispersed in water and/or other solvents. Examples of useful emulsions for first coating composition 56 include, but are not limited to, polyvinyl acetate emulsions, vinyl acetate-ethylene emulsions, acrylic homo-polymer emulsions, acrylic copolymer emulsions, acrylate-acrylonitrile copolymer emulsions, ter-polymers of vinyl acetate-vinyl chloride-ethylene emulsions, ethylene-vinyl chloride copolymer emulsions, vinyl acrylic emulsions, styrene acrylic emulsions, styrene butadiene rubber emulsions, chloroprene emulsions, poly-vinylidene chloride emulsions, emulsions based on itaconic and acrylic acid, silicone resin dispersions, and combinations and derivatives thereof. In a refinement, the polymers included in first coating composition 56 have Tg in the range of −45° C. to 100° C. Moreover, the typical size of the polymer particles contained therein is from 50 to 600 nanometers. In another refinement, first coating composition 56 is a water-based polyurethane dispersion. Examples of polyurethane dispersions include, but are not limited to, water based aliphatic polyurethane dispersions, aromatic polyurethane dispersions and urethane-acrylic hybrid dispersions and all combinations and derivatives thereof. In this variation, the particle size of the polyurethane particles is typically from 50 nanometers to 100 nanometers with Seward hardness of 0 to 100. In still another variation, first coating composition 56 includes epoxy resins, urea formaldehyde resins, melamine formaldehyde resins and phenol formaldehyde resins. In addition to polymer, first coating composition 56 and second coating composition 84 each independently further includes a fluorochemical. Details of useful fluorochemicals are set forth above. In a refinement, the fluorochemical is present in an amount from about 0.5 to about 3 weight percent of first coating composition 56 and/or second coating composition 84. First coating composition 56 and second coating composition 84 each independently includes a number of formulation additives. Examples of such additives include, but are not limited to, glycols, glycol esters, surfactants, foaming agents (for use in first coating composition 56), wax dispersions, fluorocarbons, dispersants, wetting agents, leveling agents, defoamers (for use in second coating composition 84), hydroxyl-ethyl cellulose thickeners, carboxymethyl cellulose thickeners, polyurethane base thickeners/rheology modifiers, alkali swellable thickeners, mildew/mold inhibitors, fungicides, phosphorous and melamine based flame retardant salts/solutions, mica, talc, calcium carbonate, zinc oxide, titanium dioxide and pigments among others. Typically, first coating composition 56 is a relatively non-viscous composition having a viscosity from about 4,000 to 12,000 cps (Brookfield viscometer RVT #3 spindle at 20 rpm at 20° C.). Second coating composition 84 is a paste-like viscous latex composition having a viscosity of 25,000 to 65,000 cps (Brookfield viscometer RVT #6 spindle at 20 rpm at 20° C.). In a refinement, second coating composition 84 has a viscosity of 35,000 to 45,000 cps (Brookfield viscometer RVT #6 spindle at 20 rpm at 20° C.). Accordingly, in order to meet these viscosities second coating composition 84 typically includes a greater amount of thickener than first coating composition 56. In a refinement, first coating composition 56 includes from about 0 to 3 weight percent thickener while second coating composition 84 includes from about 4 to about 10 percent thickener. The balance of first coating composition 56 and second coating composition 84 includes one or more of the additional formulation additives set forth above.

The following examples illustrate various embodiments of the present invention. Those skilled in the art will recognize many variations that are within the spirit of the present invention and scope of the claims.

Table 1 provides a representative composition for making a water permeable (foam layer) as set forth above. Typically, this composition has a viscosity from about 4,000 to 12,000 (RVT, spindle #5@20 rpm) providing a dry coating add-on of 0.5 to 2.0 oz./sq. yd. Typical Foaming Properties provide 150 gram/12 oz. foam cup weight. Foam cup weights were measured after air was mechanically or chemically introduced at specified ratios into the wet coating composition prior to application to regulate coating add-on to the fabric substrate.

TABLE 1

Foam Coating

| Component | Amount | Solids of Component | Solids in Wet Recipe | Solids in Dry Recipe | Wet % in Recipe |
| --- | --- | --- | --- | --- | --- |
| Water | 104 | 0 | 0 | 0 | 10.4 |
| Styrene Acrylic Emulsion | 772 | 49 | 37.828 | 87.69473294 | 77.2 |
| Scavenger | 15 | 100 | 1.5 | 3.477373887 | 1.5 |
| Biocide | 5 | 17.3 | 0.0865 | 0.200528561 | 0.5 |
| Fluorocarbon | 10 | 35 | 0.35 | 0.81138724 | 1 |
| Wax Emulsion | 35 | 54.7 | 1.9145 | 4.438288205 | 3.5 |
| Ammonium Stearate | 25 | 35 | 0.875 | 2.028468101 | 2.5 |
| Anionic Surfactant | 10 | 0 | 0 | 0 | 1 |
| Thickener | 18 | 20.5 | 0.369 | 0.855433976 | 1.8 |
| Rheology Modifier | 6 | 35.5 | 0.213 | 0.493787092 | 0.6 |
| Total Amount of Components | 1000 | Solids | 43.136 | 100 | 100 |

Table 2 provides a representative composition for making a water impermeable barrier layer as set forth above. Typical, this composition has a viscosity of 35,000 to 45,000 cps (RVT, spindle #6@20 rpm) and provides a dry coating add-on of 1.0 to 3.0 oz./sq. yd.

TABLE 2

Paste Coating

| Component | Amount | Solids of Component | Solids in Wet Recipe | Solids in Dry Recipe | Wet % in Recipe |
| --- | --- | --- | --- | --- | --- |
| Water | 51 | 0 | 0 | 0 | 5.1 |
| Styrene Acrylic Emulsion | 740 | 49 | 36.26 | 83.91187633 | 74 |
| Scavenger | 15 | 100 | 1.5 | 3.471257984 | 1.5 |
| Biocide | 5 | 17.3 | 0.0865 | 0.200175877 | 0.5 |
| Fluorocarbon | 10 | 35 | 0.35 | 0.809960196 | 1 |
| Wax Emulsion | 35 | 54.7 | 1.9145 | 4.430482273 | 3.5 |
| Aqueous Ammonia | 14 | 35 | 0.49 | 1.133944275 | 1.4 |
| Crosslinker | 38 | 10 | 0.38 | 0.879385356 | 3.8 |
| Thickener | 69 | 20.5 | 1.4145 | 3.273396279 | 6.9 |
| Rheology Modifier | 23 | 35.5 | 0.8165 | 1.889521429 | 2.3 |
| Total Amount of Components | 1000 | Solids | 43.212 | 100 | 100 |

Figure 7:
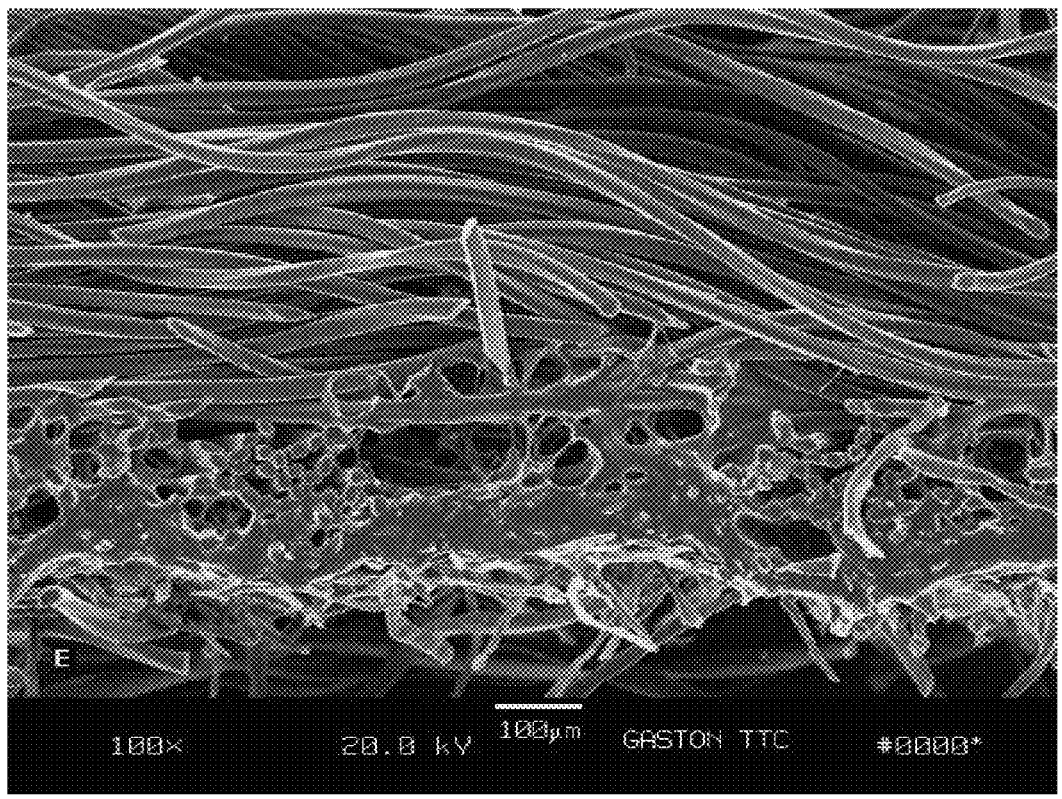
FIG. 7 provides a scanning electron micrograph (SEM) of a cross section a fabric substrate coated with a crushed foam water permeable spacer layer and a water impermeable barrier layer.
Figure 8:
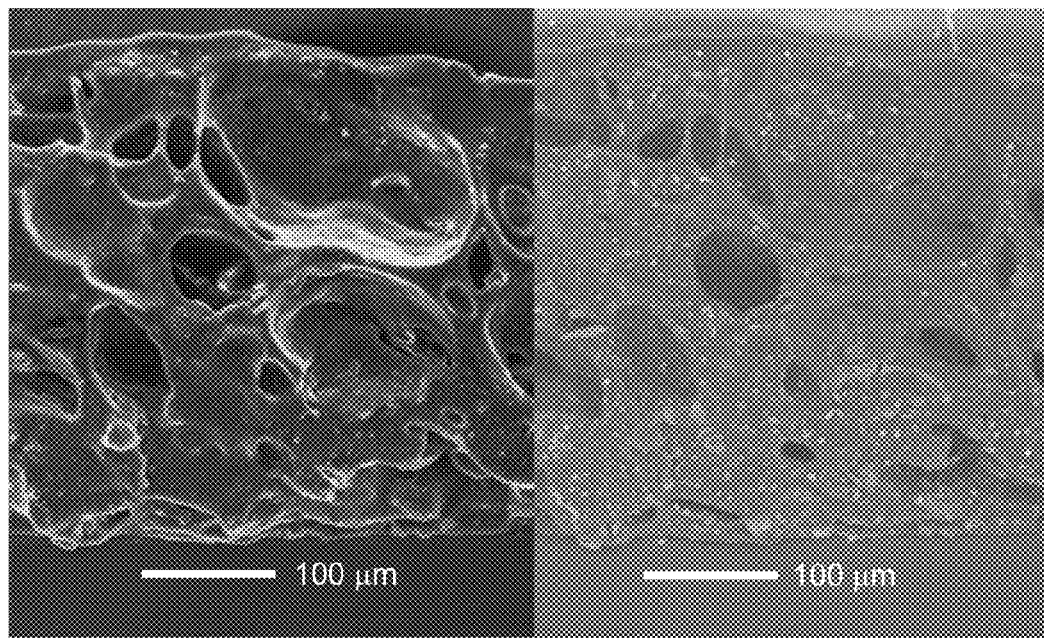
FIG. 8 provides a scanning electron micrograph of a cross section of a foamed water permeable spacer layer overcoated with water impermeable barrier layer on a Mylar® film substrate. The foamed water permeable spacer layer has zinc oxide included therein.

FIG. 7 provides a scanning electron micrograph of a cross section a fabric substrate coated with a crushed foam water permeable spacer layer and a water impermeable barrier layer. This figure demonstrates the minimal penetration of the water permeable spacer layer into the fabric substrate. FIG. 8 provides a scanning electron micrograph of a cross section of a foamed layer on a Mylar® film substrate.

Mechanical Hand Properties

Fabrics were conditioned and tests were performed in the standard atmosphere laboratory condition of 70+3° F. (21° C.), 65+5% relative humidity (RH).

A Kawabata Evaluation System (KES) was used to make objective measurements of hand properties. With low forces applied, the KES instruments measure mechanical properties that correspond to the fundamental deformation of fabrics in hand manipulation. The three of five different tests performed using KES and the main mechanical characteristics, are described below.

Samples were conditioned and measurements were made using the specimen size of 20×20 cm in three replications; however, compression test sample size was reduced to 10×10 cm. All measurements were directional, except for compression, and were made in both the lengthwise direction, and in the cross direction of the sample. Appropriate instrument settings were used for the material being tested. Table 3 provides descriptions of the samples that were measured. In these descriptions, the foam coating was the water permeable coating and the paste coating was the water impermeable barrier coating.

TABLE 3

Sample Descriptions

| Sample Identifier | Description |
| --- | --- |
| A | Light foam coating on mattress ticking |
| A2 | Sample A crushed |
| B | Heavy foam coating |
| B2 | Sample B crushed |
| D | Sample B with a paste coating |
| E | Crushed light foam coating with paste coating |
| PR | 2 paste coatings |

Compression

Compressional properties of a 2 cm$^2$ area of the fabric samples were measured with a KES-FB3 Compression Tester at 0 to 50 gf/cm$^2$ all materials. The compressibility (EMC) is provided as a percent. Initial thickness measurements were compared to the thickness of the sample at maximum applied force. A higher value indicates greater compressibility. Compressional resilience (RC) provided as a percent gives the extent of recovery or the regain in thickness, when the force was removed. Higher RC values indicate a higher percent recovery from being compressed. Thicknesses were measured for a 2 cm$^2$ area measured at 0.5 gf/cm$^2$ and reported in millimeters. Table 4 provides the results of these compression tests.

TABLE A

KES Compression Data

| Sample ID replicate | WC Compressional Energy (gf · cm/cm$^2$) | RC$^a$ Compressional Resilience (%) | LC Linearity of Compression (—) | EMC$^b$ Compressibility (%) | Thickness* (mm) |
| --- | --- | --- | --- | --- | --- |
| E -1 | 0.9022 | 29.4352 | 0.5316 | 38.6816 | 1.7550 |
| -2 | 0.8927 | 29.2728 | 0.5197 | 39.7862 | 1.7268 |
| -3 | 0.9089 | 28.7523 | 0.5115 | 40.5174 | 1.7542 |
| Avg. | 0.9013 | 29.1534 | 0.5209 | 39.6617 | 1.7453 |
| PR -1 | 0.5957 | 31.6863 | 0.4569 | 37.4628 | 1.3923 |
| -2 | 0.5609 | 32.4944 | 0.5072 | 33.3450 | 1.3268 |
| -3 | 0.5599 | 31.9386 | 0.4927 | 35.1190 | 1.2943 |
| Avg. | 0.5722 | 32.0398 | 0.4856 | 35.3089 | 1.3378 |

*Thickness of a 2 cm$^2$ area at 0.5 gf/cm$^2$.
$^a$ Higher values mean higher percent recovery from being compressed.
$^b$ Higher values indicate greater compressibility.

Bending

Bending measurements were determined with a KES-FB2 Bending Tester. Bending is a measure of the force required to bend the fabric approximately 150°. The bending rigidity per unit fabric width (B) was determined in units of gf·cm$^2$/cm. Higher B value indicates greater stiffness/resistance to bending motions. Table 5 provides the results of the bending tests.

TABLE 5

KES Bending Data

| | B $^a$ Bending Rigidity (gf · cm$^2$/cm) | | 2HB $^b$ Hysteresis of Bending Momentum (gf · cm/cm) | |
| --- | --- | --- | --- | --- |
| Sample | (L) | (C) | (L) | (C) |
| A - 1 | 0.6140 | 0.3446 | 0.8999 | 0.3255 |
| -2 | 0.5430 | 0.3655 | 0.7629 | 0.3562 |
| -3 | 0.5513 | 0.3485 | 0.8262 | 0.3174 |
| Avg. | 0.5694 | 0.3529 | 0.8297 | 0.3330 |
| L + C | 0.4612 | | 0.5814 | |
| A2 - 1 | 0.4762 | 0.3305 | 0.9720 | 0.3086 |
| -2 | 0.5194 | 0.3240 | 1.0989 | 0.3370 |
| -3 | 0.4217 | 0.3205 | 0.8855 | 0.3015 |
| Avg. | 0.4724 | 0.3250 | 0.9855 | 0.3157 |
| L + C | 0.3987 | | 0.6506 | |
| B - 1 | 0.8175 | 0.7315 | 1.1181 | 0.8115 |
| -2 | 0.8810 | 0.7161 | 1.1913 | 0.7775 |
| -3 | 0.7101 | 0.6981 | 0.9778 | 0.7506 |
| Avg. | 0.8029 | 0.7152 | 1.0957 | 0.7799 |
| L + C | 0.7591 | | 0.9378 | |
| B2 - 1 | 0.7217 | 0.6948 | 1.0094 | 0.7322 |
| -2 | 0.6219 | 0.7044 | 0.9625 | 0.7460 |
| -3 | 0.6011 | 0.6677 | 0.8472 | 0.7080 |
| Avg. | 0.6482 | 0.6890 | 0.9397 | 0.7287 |
| L + C | 0.6686 | | 0.8342 | |
| D - 1 | 0.8302 | 0.7800 | 1.3124 | 0.8014 |
| -2 | 0.9498 | 0.7374 | 1.4101 | 0.7474 |
| -3 | 0.9394 | 0.7761 | 1.4255 | 0.8025 |
| Avg. | 0.9065 | 0.7645 | 1.3827 | 0.7838 |
| L + C | 0.8355 | | 1.0832 | |
| E -1 | 0.4902 | 0.4750 | 0.9854 | 0.5060 |
| -2 | 0.4443 | 0.4648 | 0.9568 | 0.5084 |
| -3 | 0.4756 | 0.4630 | 0.9758 | 0.4925 |
| Avg. | 0.4700 | 0.4676 | 0.9727 | 0.5023 |
| L + C | 0.4688 | | 0.7375 | |
| PR - 1 | 0.7876 | 0.5068 | 1.1939 | 0.5398 |
| -2 | 1.0033 | 0.4845 | 1.3902 | 0.4948 |
| -3 | 0.9329 | 0.5345 | 1.2840 | 0.5503 |
| Avg. | 0.9079 | 0.5086 | 1.2894 | 0.5283 |
| L + C | 0.7083 | | 0.9088 | |

Note:
L = lengthwise direction; C = crosswise direction.
$^a$ Higher B value indicates greater stiffness/resistance to bending motions.
$^b$ A larger 2HB value means greater fabric inelasticity.

Shearing

Shear testing was performed with a KES-FB1 Tensile-Shear Tester which applies opposing, parallel forces to the fabric samples, until a maximum offset angle of 8° was reached. A pretension load of 10 gf/cm was applied to the specimen. Shearing stiffness ("G") provides a measure of the ease with which the fibers slide against each other. This allows a categorization of the fabric samples as bind soft, pliable, stiff, or rigid. The shear stiffness (G) was measured in units of gf/(cm·degree). Lower values indicate less resistance to the shearing movement corresponding to a softer material having better drape. Table 7 provides the shear test data.

TABLE 7

KES Shear Test Data

| Sample ID | G[a] Shear Stiffness (gf/cm · Degree) | | 2 HG Hysteresis of Shear Force @ 0.5 Degrees of Shear Angle (gf/cm) | | 2HG5 Hysteresis of Shear Force @ 5.0 Degrees of Shear Angle (gf/cm) | |
|---|---|---|---|---|---|---|
| replicate | (L) | (C) | (L) | (C) | (L) | (C) |
| A - 1 | 1.8883 | 1.6830 | 3.6923 | 3.1743 | 4.6645 | 4.5473 |
| -2 | 1.8499 | 1.6711 | 3.6913 | 3.2311 | 4.6272 | 4.4228 |
| -3 | 1.8586 | 1.6691 | 3.8351 | 3.1573 | 4.7086 | 4.3526 |
| Avg. | 1.8656 | 1.6744 | 3.7396 | 3.1876 | 4.6668 | 4.4409 |
| L + C | 1.7700 | | 3.4636 | | 4.5538 | |
| A2 - 1 | 1.9831 | 1.7553 | 3.9813 | 3.4509 | 5.1422 | 4.8877 |
| -2 | 1.9086 | 1.5787 | 4.0860 | 3.4657 | 4.9677 | 4.4256 |
| -3 | 1.9341 | 1.6771 | 3.8323 | 3.3469 | 4.9430 | 4.5300 |
| Avg. | 1.9419 | 1.6704 | 3.9665 | 3.4212 | 5.0176 | 4.6144 |
| L + C | 1.8062 | | 3.6939 | | 4.8160 | |
| B -1 | 2.1556 | 2.1029 | 5.5012 | 4.9800 | 5.6019 | 5.3275 |
| -2 | 2.3563 | 2.0923 | 5.3056 | 5.1697 | 5.7548 | 5.6198 |
| -3 | 2.1316 | 1.5078 | 5.4061 | 4.9931 | 5.6173 | 4.7986 |
| Avg. | 2.2145 | 1.9010 | 5.4043 | 5.0476 | 5.6580 | 5.2486 |
| L + C | 2.0578 | | 5.2260 | | 5.4533 | |
| B2 - 1 | 2.3815 | 2.1484 | 5.4345 | 5.1068 | 5.8574 | 5.6160 |
| -2 | 2.3095 | 2.1618 | 5.4094 | 5.0443 | 5.7441 | 5.4889 |
| -3 | 2.2573 | 1.9831 | 5.2987 | 4.8871 | 5.5339 | 5.0968 |
| Avg. | 2.3161 | 2.0978 | 5.3809 | 5.0127 | 5.7118 | 5.4006 |
| L + C | 2.2069 | | 5.1968 | | 5.5562 | |
| D - 1 | 2.1616 | 2.2016 | 5.3165 | 5.4517 | 6.1689 | 6.3013 |
| -2 | 2.5598 | 2.3330 | 5.6424 | 5.1979 | 6.4029 | 6.0451 |
| -3 | 2.4232 | 2.2846 | 5.6830 | 5.2772 | 6.2546 | 6.1656 |
| Avg. | 2.3815 | 2.2731 | 5.5473 | 5.3089 | 6.2755 | 6.1707 |
| L + C | 2.3273 | | 5.4281 | | 6.2231 | |
| E - 1 | 3.2399 | 2.6935 | 7.1512 | 7.8991 | 7.8735 | 8.0434 |
| -2 | 3.1764 | 2.9570 | 6.9945 | 6.7327 | 7.5712 | 7.5046 |
| -3 | 3.1513 | 2.9054 | 7.4269 | 6.6729 | 8.0985 | 7.3544 |
| Avg. | 3.1892 | 2.8520 | 7.1909 | 7.1016 | 7.8477 | 7.6341 |
| L + C | 3.0206 | | 7.1462 | | 7.7409 | |
| PR - 1 | 3.9850 | 3.8023 | 9.8679 | 9.5946 | 11.0563 | 10.2051 |
| -2 | 4.0659 | 3.5539 | 9.6471 | 8.8426 | 10.4320 | 8.9308 |
| -3 | 3.8170 | 3.7474 | 9.2341 | 9.0604 | 9.7180 | 8.9864 |
| Avg. | 3.9560 | 3.7012 | 9.5830 | 9.1659 | 10.4021 | 9.3741 |
| L + C | 3.8286 | | 9.3745 | | 9.8881 | |

Note:
L = lengthwise direction; C = crosswise direction.
[a] Higher value means greater stiffness/resistance to shearing movement.

Table 8 summarizes the mechanical hand properties. It is noteworthy that the bending and shear properties of a fabric coated with a water permeable spacer layer and a water impermeable barrier layer (Sample E) indicate a more natural hand than a sample with only a water impermeable barrier layer (Sample PR).

While embodiments of the invention have been illustrated and described, it is not intended that these embodiments illustrate and describe all possible forms of the invention. Rather, the words used in the specification are words of description rather than limitation, and it is understood that

TABLE 8

Summary of Mechanical Hand Properties

| Property | | A | A2 | B | B2 | D | E | PR |
|---|---|---|---|---|---|---|---|---|
| Compression: | EMC (%)[a] | — | — | — | — | — | 39.6617 | 35.3089 |
| | RC (%)[b] | — | — | — | — | — | 29.1534 | 32.0398 |
| | Thickness (mm) | — | — | — | — | — | 1.7453 | 1.3378 |
| Bending: B (gf*cm$^2$/cm)[c] | | 0.4612 | 0.3987 | 0.7591 | 0.6686 | 0.8355 | 0.4688 | 0.7083 |
| Shear: G (gf/cm*degree)[d] | | 1.7700 | 1.8062 | 2.0578 | 2.2069 | 2.3273 | 3.0206 | 3.8286 |

[a] A high EMC value indicates greater compressability.
[b] High values mean a higher percent recovery from being compressed.
[c] Low B values indicate less stiffness or resistance to bending motions.
[d] A low value indicates less resistance to shearing movements; soft, pliable, drapeable.

various changes may be made without departing from the spirit and scope of the invention.

What is claimed is:

1. An article comprising:
   a fabric substrate having a front face and a back side;
   a water permeable spacer layer disposed over the back side of the fabric substrate, the water permeable spacer layer including a plurality of pores in which a majority of pores have an aspect ratio that is less than 0.1 and the water permeable spacer layer having a mass density from 0.1 g/ml to 0.7 g/ml, a majority of pores having a maximum Feret diameter greater than 5 microns and less than 300 microns; and
   a water impermeable barrier layer disposed over the water permeable spacer layer, the water impermeable barrier layer having a mass density from 0.75 g/ml to about 1.3 g/ml, the article having a bend rigidity from 0.35 to 0.7 gf·cm$^2$/cm wherein the water permeable spacer layer and the water impermeable barrier layer having a combined dry thickness less than or equal to 23 mils.

2. The article of claim 1 wherein the water permeable spacer layer has a dry thickness from 1 mil to 10 mils.

3. The article of claim 1 wherein the water impermeable barrier layer has a thickness from 1 mil to 13 mils.

4. The article of claim 1 wherein the water impermeable barrier layer is substantially free of pores.

5. The article of claim 1 wherein the water permeable spacer layer and the water impermeable barrier layer each independently include a polymer.

6. The article of claim 5 wherein the water permeable spacer layer and the water impermeable barrier layer each independently include a component selected form the group consisting of polyvinyl acetate, vinyl acetate-ethylene copolymers, acrylic homo-polymers, acrylic copolymers, acrylate-acrylonitrile copolymers, ter-polymers of vinyl acetate-vinyl chloride-ethylene, ethylene-vinyl chloride copolymers, vinyl acrylic polymers, styrene acrylic polymers, styrene butadiene rubbers, chloroprene polymers, poly-vinylidene chloride polymers, silicone resins, and combinations thereof.

7. The article of claim 5 wherein at least one of the fabric substrate, water permeable spacer layer and the water impermeable barrier layer includes a fluorochemical dispersed therein.

8. The article of claim 7 wherein the fluorochemical includes a component selected from the group consisting of fluorocarbons, partially fluorinated urethanes, fluorinated copolymers, fluorinated acrylic copolymers, partially fluorinated condensation polymers, perfluoroalkyl acrylic copolymers, perfluoroalkylethyl methacrylate copolymers, perfluoroalkyl methacrylic copolymers, perfluoroalkylethyl methacrylate copolymers, and combinations thereof.

9. The article of claim 7 wherein the water permeable spacer layer and the water impermeable barrier layer each independently include the fluorochemical in an amount from about 0.2 weight percent to about 3.0 weight percent.

10. The article of claim 7 wherein the water permeable spacer layer and the water impermeable barrier layer each independently include a component selected from the group consisting of glycols, glycol esters, surfactants, wax dispersions, dispersants, wetting agents, leveling agents, hydroxylethyl cellulose thickeners, carboxy-methyl cellulose thickeners, polyurethane thickeners, rheology modifiers, alkali swellable thickeners, mildew/mold inhibitors, fungicides, phosphorous and melamine based flame retardant salts/solutions, mica, talc, calcium carbonate, zinc oxide, titanium dioxide, pigments, and combinations thereof.

11. An article comprising:
    a fabric substrate having a front face and a back side;
    a water permeable spacer layer contacting the back side of the fabric substrate, the water permeable spacer layer allowing penetration of water at hydrostatic pressures applied to the front face of the fabric substrate that are greater than or equal to a first hydrostatic pressure when the fabric substrate is only coated with the water permeable spacer layer, the water permeable spacer layer including a plurality of collapsed pores in which a majority of collapsed pores have an aspect ratio less than 0.1; and
    a water impermeable barrier layer disposed over the water permeable spacer layer, the water impermeable barrier layer not allowing penetration of water through the article at hydrostatic pressures applied to the front face of the fabric substrate that are up to a second hydrostatic pressure of 100 millibar, the ratio of the second hydrostatic pressure to the first hydrostatic pressure being greater than or equal to 10, the water permeable spacer layer having a mass density that is less than 80 percent of a mass density of the water impermeable barrier layer wherein the water permeable spacer layer and the water impermeable barrier layer having a combined dry thickness less than or equal to 23 mils.

12. The article of claim 11 wherein the water permeable spacer layer has a dry thickness from 1 mil to 10 mils.

13. The article of claim 11 wherein the water impermeable barrier layer has a dry thickness from 1 mil to 13 mils.

14. The article of claim 11 wherein the water permeable spacer layer and the water impermeable barrier layer each independently include a polymer.

15. The article of claim 14 wherein the water permeable spacer layer and the water impermeable barrier layer each independently include a component selected form the group consisting of polyvinyl acetate, vinyl acetate-ethylene copolymers, acrylic homo-polymers, acrylic copolymers, acrylate-acrylonitrile copolymers, ter-polymers of vinyl acetate-vinyl chloride-ethylene, ethylene-vinyl chloride copolymers, vinyl acrylic polymers, styrene acrylic polymers, styrene butadiene rubbers, chloroprene polymers, poly-vinylidene chloride polymers, silicone resins, and combinations thereof.

16. The article of claim 14 wherein at least one of the fabric substrate, water permeable spacer layer and the water impermeable barrier layer includes a fluorochemical dispersed therein.

17. The article of claim 16 wherein the fluorochemical includes a component selected from the group consisting of fluorocarbons, partially fluorinated urethanes, fluorinated copolymers, fluorinated acrylic copolymers, partially fluorinated condensation polymers, perfluoroalkyl acrylic copolymers, perfluoroalkylethyl methacrylate copolymers, perfluoroalkyl methacrylic copolymers, perfluoroalkylethyl methacrylate copolymers, and combinations thereof.

18. The article of claim 16 wherein the water permeable spacer layer and the water impermeable barrier layer each independently include the fluorochemical in an amount from about 0.2 weight percent to about 3.0 weight percent.

19. The article of claim 16 wherein the water permeable spacer layer and the water impermeable barrier layer each independently include a component selected from the group consisting of glycols, glycol esters, surfactants, wax dispersions, dispersants, wetting agents, leveling agents, hydroxylethyl cellulose thickeners, carboxy-methyl cellulose thickeners, polyurethane thickeners, rheology modifiers, alkali swellable thickeners, mildew/mold inhibitors, fungicides, phosphorous and melamine based flame retardant salts/solutions, mica, talc, calcium carbonate, zinc oxide, titanium dioxide, pigments, and combinations thereof.

20. The article of claim 1 wherein the water permeable spacer layer allows penetration of water therethrough at hydrostatic pressures applied to the front face of the fabric substrate greater than or equal to a first hydrostatic pressure when the fabric substrate is only coated with the water permeable spacer layer and wherein the water impermeable barrier layer does not allow penetration of water through the article at hydrostatic pressures applied to the front face of the fabric substrate up to a second hydrostatic pressure of 100 millibar, the second hydrostatic pressure being greater than the first hydrostatic pressure.

21. An article comprising:
   a fabric substrate having a front face and a back side;
   a water permeable spacer layer disposed over the back side of the fabric substrate, the water permeable spacer layer unable to support a water column at 21° C. greater than 20 cm in height without penetration; the water permeable spacer layer including a plurality of pores in which a majority of collapsed pores have an aspect ratio that is less than 0.1 and having a mass density from 0.1 g/ml to 0.7 g/ml, a majority of pores having a maximum Feret diameter greater than 5 microns and less than 300 microns; and
   a water impermeable barrier layer disposed over the water permeable spacer layer, the water impermeable barrier layer being able to support a water column at 21° C. greater than 30 cm in height without penetration, the article having a bend rigidity from 0.35 to 0.7 gf·cm$^2$/cm wherein the water permeable spacer layer and the water impermeable barrier layer have a combined dry thickness less than or equal to 23 mils.

22. The article of claim 21 wherein the water impermeable barrier layer has a mass density from 0.75 g/ml to about 1.3 g/ml.

* * * * *